Jan. 22, 1952     G. B. SAYRE     2,583,393
ELECTRONIC HEATING
Filed May 23, 1946     6 Sheets-Sheet 1

INVENTOR.
GORDON B SAYRE
BY
ATTORNEYS

Jan. 22, 1952     G. B. SAYRE     2,583,393
ELECTRONIC HEATING

Filed May 23, 1946     6 Sheets-Sheet 2

INVENTOR.
GORDON B. SAYRE
BY
ATTORNEYS

Jan. 22, 1952          G. B. SAYRE          2,583,393
ELECTRONIC HEATING
Filed May 23, 1946          6 Sheets-Sheet 3
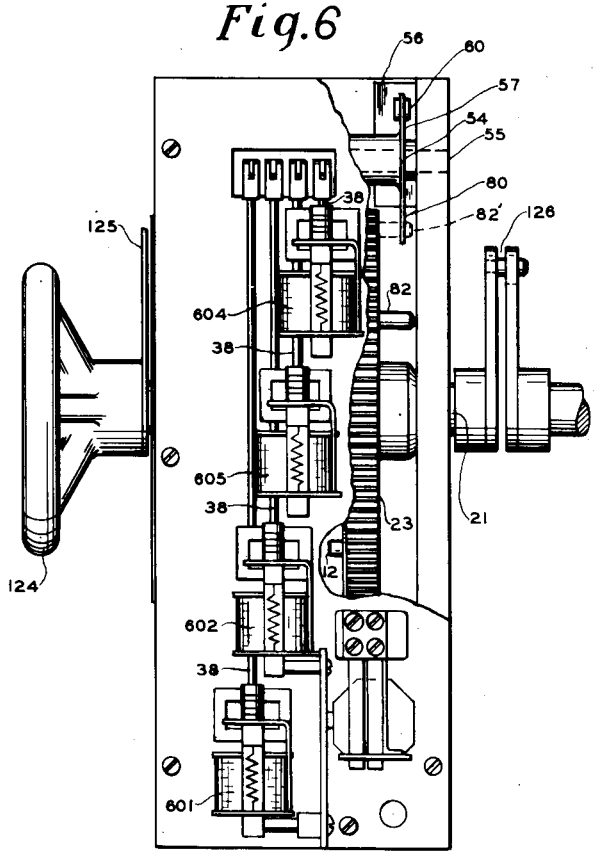
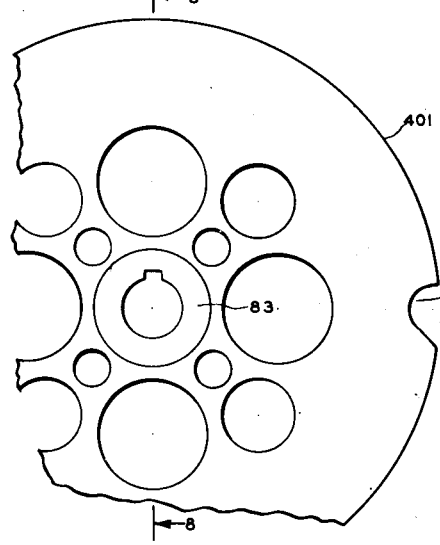
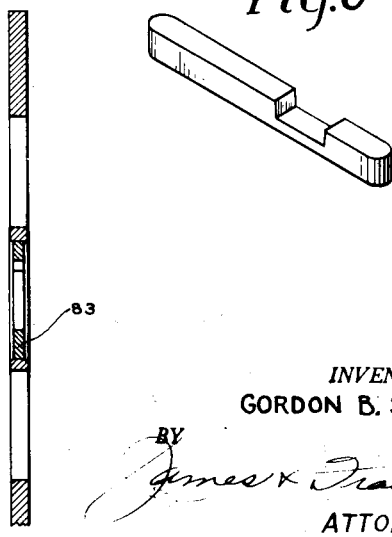
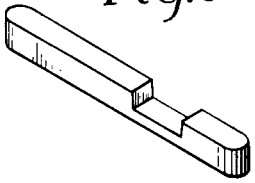
*INVENTOR.*
GORDON B. SAYRE
BY
*ATTORNEYS*

Jan. 22, 1952   G. B. SAYRE   2,583,393
ELECTRONIC HEATING
Filed May 23, 1946   6 Sheets-Sheet 4
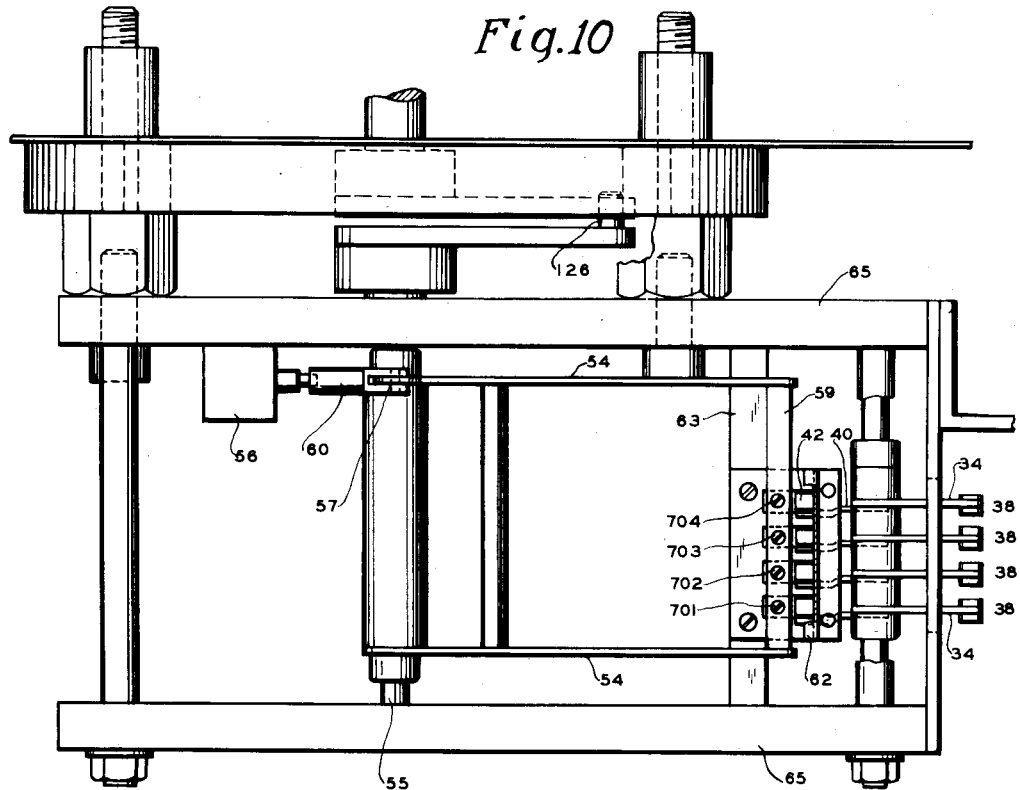
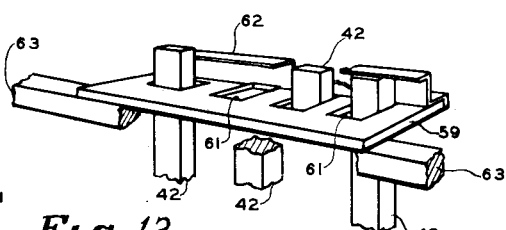
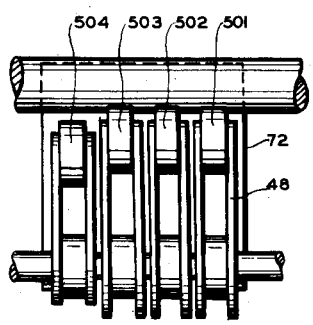
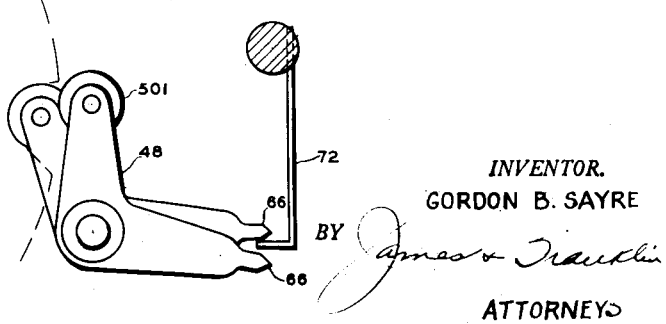
INVENTOR.
GORDON B. SAYRE
BY
ATTORNEYS Jan. 22, 1952     G. B. SAYRE     2,583,393
ELECTRONIC HEATING Filed May 23, 1946     6 Sheets-Sheet 5

INVENTOR.
GORDON B. SAYRE
ATTORNEYS

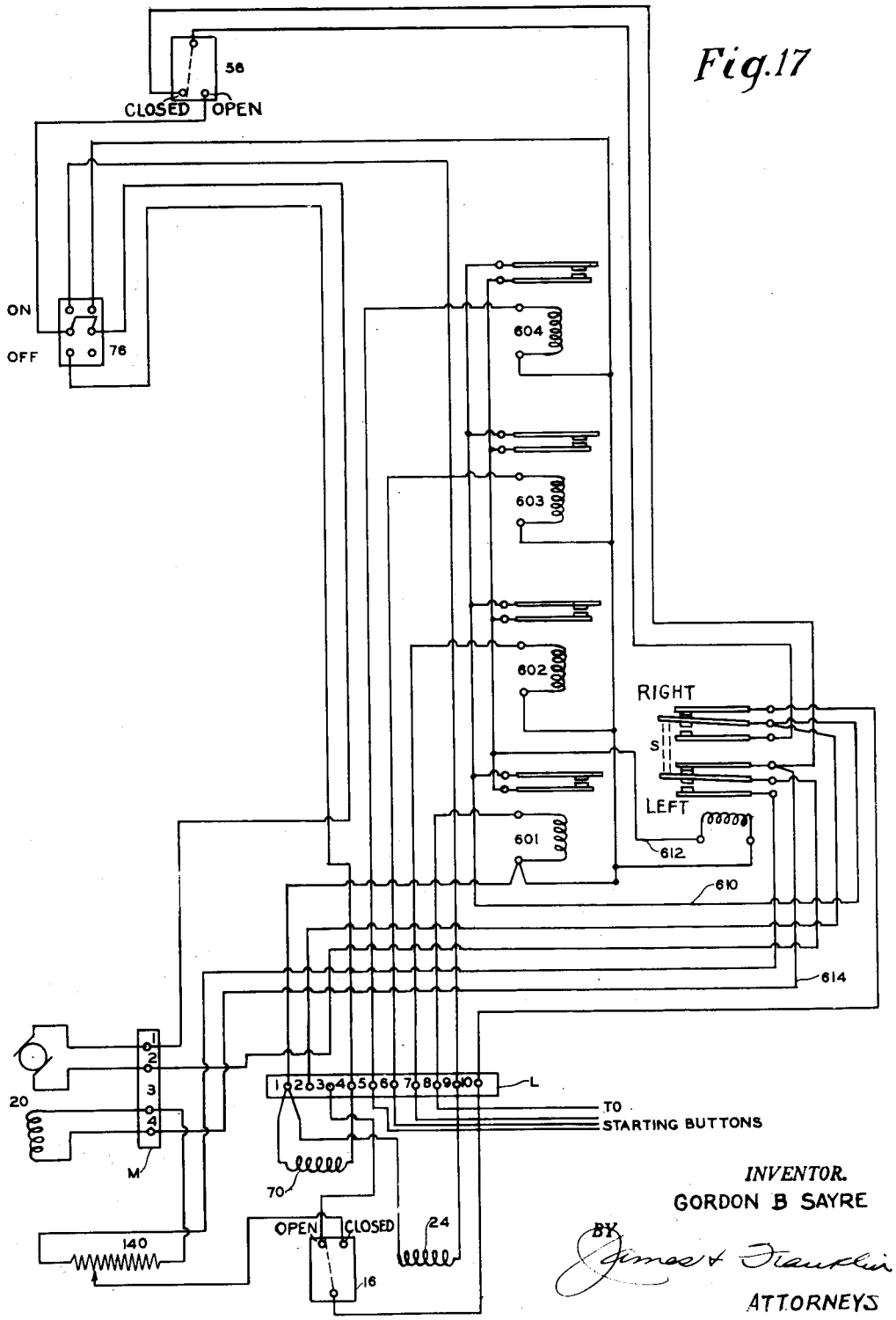

Patented Jan. 22, 1952

2,583,393

UNITED STATES PATENT OFFICE 2,583,393

ELECTRONIC HEATING

Gordon B. Sayre, Boonton, N. J., assignor to Boonton Molding Company, Boonton, N. J., a corporation of New Jersey Application May 23, 1946, Serial No. 671,706

18 Claims. (Cl. 219—20)

This invention relates to electronic heating, and more particularly to the heating of pills during the molding of thermosetting materials.

The primary object of the invention is to generally improve electronic heating, and more particularly the heating of pellets or so-called "pills" of thermosetting material, preparatory to curing and molding the same to final shape.

It is already known to heat pills electronically, that is by radio frequency power. The radio frequency generator or so-called "driver" is comparatively large and costly, yet may be largely idle if the pills are heated in much less time than is needed to cure the material in the molding press. Of course, if the quantity being made of a single product is so great as to keep two or three molding presses busy, one electronic heater might be used to feed the two or three presses, but that is relatively unusual in a custom molding plant, because the cost of the mold is so high that it is customary to use only a single mold and press, these being operated longer hours if need be.

One object of the present invention is to adapt a generator to drive several heating heads for several molding presses making different products and requiring pills of different size. For best efficiency a different spacing is used for the electrodes between which the pill is inserted, which in turn makes it desirable to apply different radio frequency voltages, because otherwise a high voltage useful for widely spaced electrodes would arc across the more closely spaced electrodes. An object of the invention is to automatically adjust the driver voltage to fit the head to which it is connected.

Another object of the invention is to apply the load to the driver gradually instead of abruptly. At the beginning of each heating cycle the voltage is raised until it reaches a predetermined desired value for the particular heating head then being energized. This progressive application of power prolongs the life of the tubes. The apparatus preferably includes a timing clock which drops the output of the driver after each heating cycle.

A still further object of the invention is to make the different voltage values for the different heads quickly and easily adjustable.

To the accomplishment of the foregoing general objects and other more detailed objects which will hereinafter appear, the invention resides in the radio frequency generator and power supply elements with multiple heating heads, and their relation one to the other, as are hereinafter more particularly described, and sought to be claimed in the appended claims. The specification is accompanied by drawings in which:

Figure 6 is a side elevation of the mechanism shown in Figure 1;

Figure 7 is a front elevation of one of a series of cams forming a part of the mechanism;

Figure 8 is a section through the cam taken on line 8—8 of Figure 7;

Figure 9 is a perspective view of a key used in the apparatus;

Figure 10 is a top view showing a part of the mechanism;

Figure 11 is a perspective view explanatory of the construction of the detent plate;

Figure 12 is a vertical elevation taken approximately at 12—12 in Figure 1;

Figure 13 is explanatory of the operation of the locking plate;

Figure 17 is a wiring diagram of the low voltage control wiring.

Figure 15:
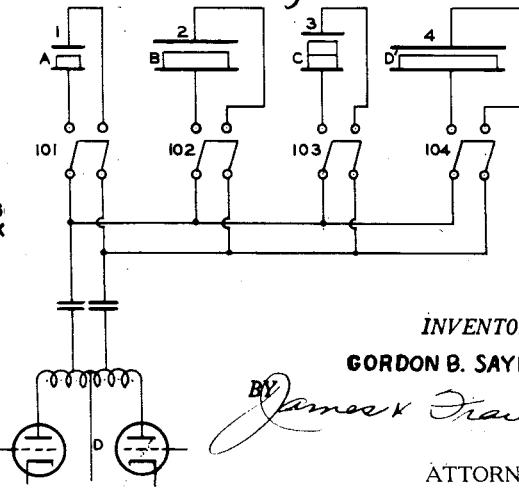
Figure 15 is explanatory of one part of the invention.

Referring to the drawing, and more particularly to Figure 15, the pill heating apparatus comprises a plurality, in this case four, heating heads 1, 2, 3, and 4, intended to heat pills for use in a plurality of molding presses, not shown. The presses are assumed to be making different articles requiring differently sized pills, and these pills of different size are indicated at A, B, C, and D'. In accordance with the present invention the different heating heads are all driven by a single radio frequency generator or driver, schematically indicated at D. This may be connected to one head or another by means of radio frequency switches 101, 102, 103, and 104. These may be manually operated.

Figure 14:
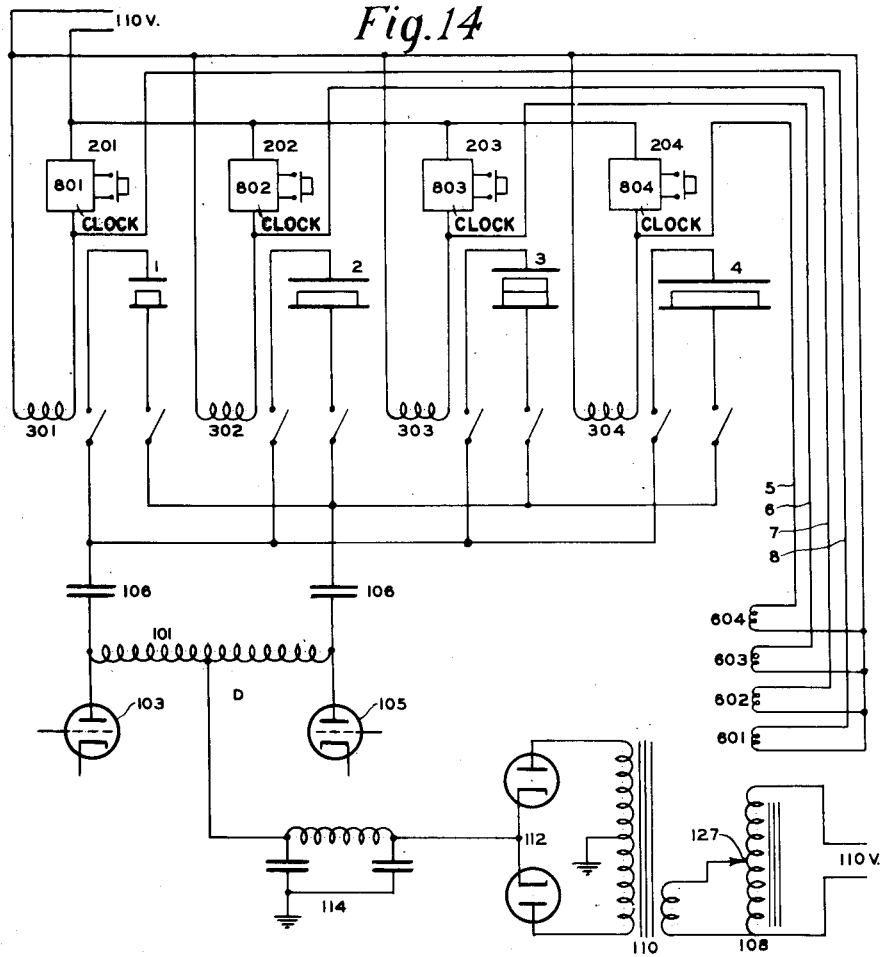
Figure 14 is a schematic wiring diagram showing the radio frequency circuit in simplified form, together with a portion of the control wiring.

Inasmuch as the pills of different size preferably employ different electrode spacings, which should prefarebly receive different radio frequency voltages, a more preferred form of the present invention is shown in Figure 14, which includes means generally designated 108 for varying the voltage output of the driver D. Most conveniently, a plurality of push buttons or equivalent control elements 201, 202, 203, and 204 are provided at the heads for so controling both the radio frequency switches 301, 302, 303 and 304, and the voltage varying means 108, that the voltage output of the driver supplied to each head is automatically given a predetermined desired value when that head is connected to the driver. The voltage control means 108 is preferably a variable auto transformer or so-called "variac," which varies the power line voltage fed to the power supply portion of the driver D.

Figure 2:
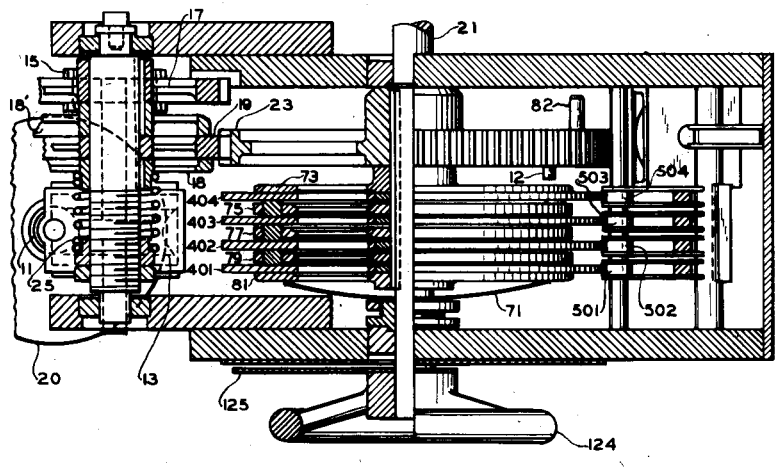
Figure 2 is a section taken in the plane of the line 2—2 of Figure 1.
Figure 1:
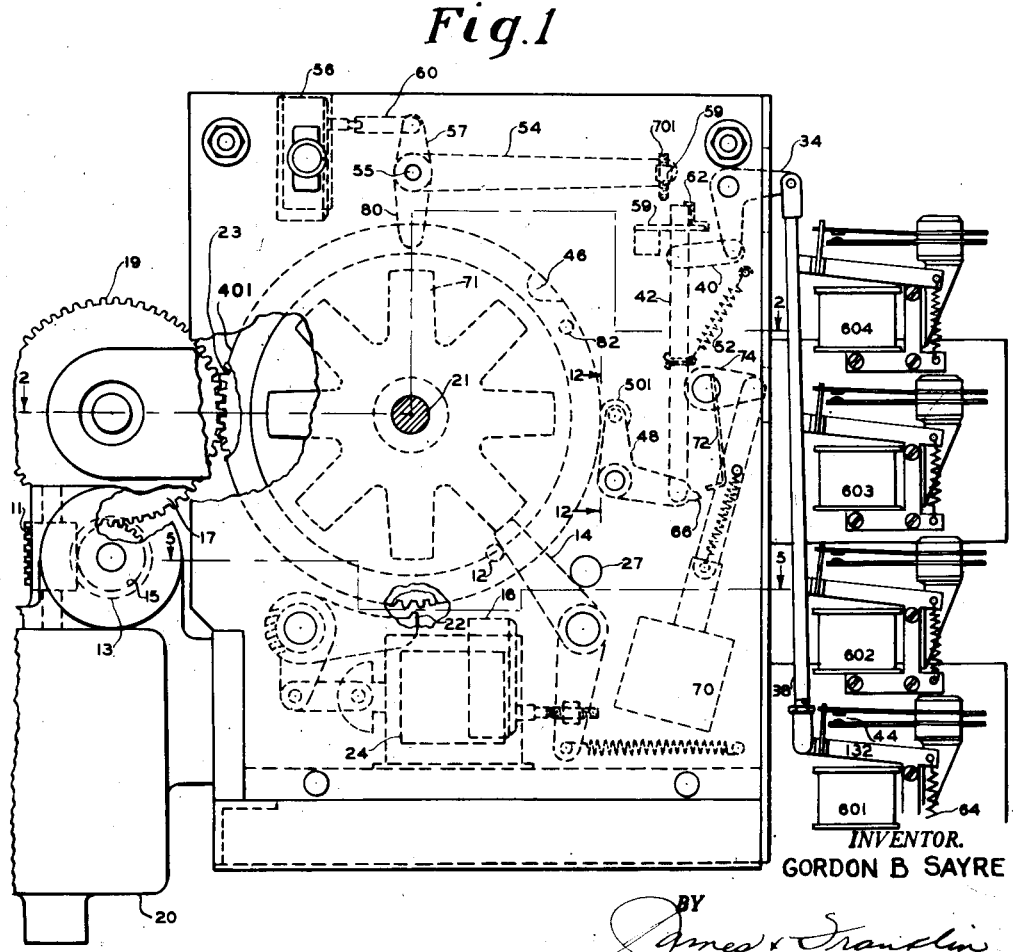
Figure 1 is a front elevation of mechanism embodying features of my invention.

Referring now to Figures 1, 2, and 17, the mechanism to turn the variac to any one of multiple desired positions includes a motor 20 for driving an extension 21 of the variac shaft, a plurality of cam discs 401, 402, 403, and 404 on the shaft, each of said discs having a stop depression, and each being rotatively adjustable on the shaft to any desired position. There are also a plurality of stop means 501, 502, 503, and 504 for engaging the cams, and remotely controllable means 601, 602, 603, and 604 to make one of said stop means operative, and to start the motor in a forward direction. When the stop means enters its mating cam depression it functions to stop the motor. Each head of the apparatus is also preferably provided with a timing clock which on running out, cuts off the power and returns the cam to initial position.

Again referring to Figure 14, and considering the apparatus in greater detail, ordinary power line current is supplied to a step-up transformer 110 through the variac 108, the said transformer 110 raising the voltage to, say 4,000 volts. The output of transformer 110 is fed to a rectifier 112, which in the present case is a full-wave rectifier. The rectified output is filtered by an appropriate filter 114, and the resulting direct current is applied to the middle point of inductor 101.

The oscillator tubes are indicated at 103 and 105, and work in push pull. The resonant circuit of the oscillator comprises the inductor 101, and the capacitance of the electrodes of one of the heads 1, 2, 3, or 4. The capacitors 106 are blocking capacitors to take the high direct anode potential off the wiring, switches, and heads. This may also be done by inductive coupling. It will be understood that the tubes include conventional grids and cathodes with associated circuits regeneratively coupled to the resonant anode circuit. This feed back coupling may be obtained in any desired conventional fashion, to cause self-oscillation. The conventional circuit elements have been omitted in order to simplify the drawing.

If timing clocks are used, as later described, each button 201, 202, 203, and 204 is preferably associated with a timing clock represented at 801, 802, 803, and 804 in Figure 14, and is released on running out of its timing clock. Each push button controls one of the radio frequency switches, as by means of the solenoid coils shown at 301, 302, 303, and 304. The push button circuits further include remote relay coils marked 601, 602, 603, and 604, respectively. These are located at the variac control mechanism, and correspond to the similarly numbered coils in Figures 1 and 17. Thus when the starting button at any one head is pressed it connects that head to the driver, and runs the variac to the desired voltage.

Referring again to Figures 1 and 2, the handwheel 124 is removed from the variac, and my control apparatus is inserted between the variac, not shown, and the handwheel. The control apparatus and the variac are coupled, this being done if desired by means of a flexible coupling 126 shown in Figures 6 and 10. In the particular form of control apparatus here shown, the variac is driven in both directions by motor 20, the latter being reversible.

The motor 20 drives a worm 11 turning a gear 13 which drives a pinion 15 meshing with a gear 17 (Figure 2), driving a gear 19, which meshes with a gear 23 on the main shaft 21. Gear 19 is not keyed to its shaft, the key being cut away as shown in Figure 9 to permit rotation of gear 19. A slip clutch 18, 18' (Figure 2) under pressure of spring 25 is provided to frictionally drive gear 19, and this permits some slippage or coasting of the motor when shaft 21 is abruptly stopped. In Figure 2 it will be seen that gear 17 and clutch plates 18 and 18' are keyed together, but not to gear 19. A stop for the return movement of the variac is provided by a pin 12 (Figures 1 and 3) on gear 23 which hits lever 14 and moves it against stationary stop 27, and at the same time works microswitch 16 to open the motor reverse circuit.

Figure 5:
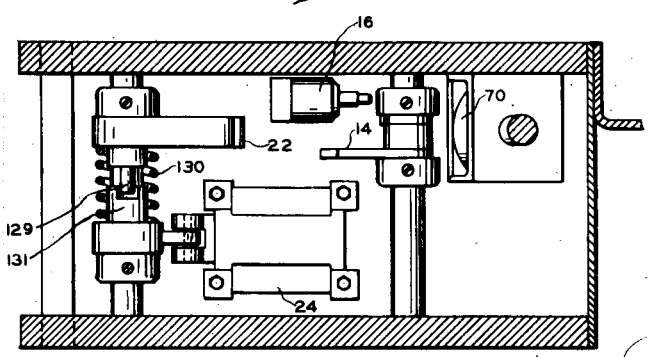
Figure 5 is a section taken in the plane of the line 5—5 in Figure 1.

The stop action going forward is also preferably made positive, for accuracy in the adjustment of the different stop positions. It is obtained by means of a pawl 22 (Figures 1 and 3) which enters the teeth of gear 23, this pawl being worked by a solenoid 24. A torsion spring 130 (see Figure 5) may be connected between the solenoid 24 and the pawl 22, to yield if the pawl hits the top of a tooth before moving between two teeth. The yielding movement may be limited by stops 129 and 131. A special notched stop wheel or pilot wheel may be used, instead of using the gear 23 for two purposes, as is here done.

A description of one of the four selectors 601, 602, 603, and 604 applies to all. Each selector acts both as an electrical relay and as a mechanical control. The selector 601 (Figure 3) is typical, and is remotely controlled by the manual switch 201 (Figure 14) at the head. When selector 601 (Figure 3) is energized it pulls rod 38, thus moving bell crank 34 from the solid line position to the dotted line position, and through link 40 moves sticker rod 42 to the left, much as at 42' but in down position, rather than up as shown at 42'. Magnet 601 also closes contacts 44, which act on a magnetic motor-reversing switch (S in Figure 17) and motor 20 turns the shaft 21 (and the variac) clockwise.

Cam 401 (Fig. 3) corresponds to relay 601, and has a recess 46. Angle lever 48 carries cam roller 501 riding on cam 401 under tension of spring 52 connected to sticker rod 42. When recess 46 reaches the roller 501 the angle lever 48 moves from solid line to dotted line position, and the sticker rod 42 rises under an adjustable screw 701 on a lever 54, which operates link 60 and microswitch 56. The construction of lever 54 is best shown in Figures 1, 6, and 10, it comprising spaced arms 54 pivoted at 55 and having an upward arm 57 integral with one of the arms 54, and connected to the link 60. Arms 54 are joined by a cross bar 59 which carries four adjustable screws 701, 702, 703, and 704 (see Figure 10), these screws being for convenience of mechanical adjustment in relation to the four sticker rods. The switch 56 stops motor 20, and causes solenoid 24 (Figures 1, 3, and 5) to move pawl 22 into the teeth of gear 23, thereby locking the shaft 21 and the variac. Slip clutch 18, 18', 19, 25 (Figure 2) lets motor 20 coast to a stop.

When the timing clock runs out it performs the equivalent of opening the switch 201 (Figure 14) at the head, which releases magnet 601 (Figure 3), and so opens contacts 44, thus reversing the motor reversing switch (S in Figure 17) to start the motor 20 in the opposite direction. De-energization of magnet 601 (Figure 3) also permits spring 64 to raise armature 132 and link 38, which changes bell crank 34 from the dotted line position to the solid line position, and so moves sticker rod 42 to the right, instantaneously, and before rotation of the cam 401 causes roller 501 to lower sticker rod 42.

The variac and cam 401 turn counterclockwise and roller 501 rises out of recess 46 and pulls sticker rod 42 down, whereupon the upper end of sticker rod 42 is latched under a stationary retainer or detent 62. The purpose of detent 62 is to normally prevent the rollers 501, 502, 503, and 504 from entering the recesses of their associated cams, except for that cam and roller which has been selected at the head. Three rollers are held out by detent 62 acting on three sticker rods, while the fourth roller whose sticker rod has been released from the detent will function.

The construction of the detent is best shown in Figures 10 and 11. It comprises a stationary guide plate 59 having four guide slots 61 through which the sticker rods 42 pass. This guide plate is secured to a stationary cross member 63 fixed between the walls 65 of the mechanism. The detent plate 62 is itself fastened to guide plate 59. In Figure 11 one of the sticker rods is shown in up position, but in this case it is the rod associated with relay 604.

As so far described, the variac will run to a predetermined position, dependent upon the location of recess 46, each time the switch at a head is closed. The way the position of recess 46 is set is next described. The switch at a head is closed, causing the variac to run to the recess 46. A manually operable switch 76 (shown in Figure 17) is next thrown from "on" (meaning "on automatic") to "off" (meaning "off automatic"). This opens the circuit of solenoid 24 (Figure 3) and closes the circuit of another solenoid 70. As a safety feature the change of manual switch 76 opens the motor circuit, but this is not essential because sticker rod 42 and lever 54 operate microswitch 56 to stop the motor. However, the extra safety feature permits tolerance and lost motion in certain locking mechanism next described.

Solenoid 70 (Figures 3 and 4) causes lever 74 to move a lock plate 72 between the tails 66 of the angle levers 48. The tail 66 of the lever 48 of the cam being adjusted is above the lock plate 72 and is locked in that position, while the tails 66' of the other levers are below the lock plate and are held against movement. The operator now turns the handwheel 124 (with associated pointer 125 and shaft 21 and variac) to desired position. The cams 401, 402, 403 and 404 are held on shaft 21 frictionally, under pressure of spring 71 (Figures 1 and 2). End disc 73 (Figure 2) is secured to shaft 21. Intermediate discs 75, 77, and 79, as well as opposite end disc 81, are all slidably keyed to shaft 21, and are pressed toward end disc 73 by spring 71. The said intermediate discs may be provided with inserts or plugs of friction material. The cams are not keyed to the shaft, and have inserts 83 (Figures 7 and 8) which are keyed to the shaft but around which the cams can rotate. In this way the cams are centered, yet clear the key for rotation therearound.

Inasmuch as cam 401 is held against movement by locked roller 501, the cam assumes a new rotative position relative to the handwheel and shaft 21 (and the brush or wiper contact of the variac, not shown except schematically at 127 in Figure 14). Because the other rollers are inoperative, the other cams turn with the shaft 21, and do not experience any change in position relative to the handwheel 124. The adjustment of any one cam is therefore independent of the adjustment of all the others.

This adjustment is usually made by trial. The variac handle may be turned up until a spark flashes across the electrodes at the head, whereupon it is turned back an arbitrary amount to prevent flashover and to prevent burning of the pill. The manual switch 76 (Figure 17) is then thrown back to "on," thereby disconnecting solenoid 70, and withdrawing the lock plate 72, and connecting solenoid 24, so that the apparatus is again ready for normal operation.

As a detail, there is another safety pin 82 (Figures 1, 3, and 6) to protect the variac brushes in the event of failure of the automatic apparatus to stop. At the end of a full scale movement, say 320 degrees, the pin 82 hits a lever 80 which is an extension of lever 54 and which, through link 60, operates the limit switch 56 to stop the motor. In Figure 6 this is indicated by the broken line position 82' of the pin.

The low voltage control wiring is explained with reference to Figure 17. In that diagram, terminals 1 and 2 of terminal strip L represent or are connected to a 110-volt power line, hereinafter, for convenience, referred to as L-1 and L-2. L-1 is common to all circuits, and all switching is done in L-2. The motor reversing switch is indicated at S. The four relays are shown at 601, 602, 603, and 604. The motor armature and field are shown at 20, connected to a motor terminal strip M. The limit switch 56 is the microswitch which acts as a forward limit switch when the variac turns clockwise. The limit switch 16 is a back limit switch to stop the motor and variac when moving counterclockwise on reaching zero. The switches 201, 202, 203, and 204 shown in Figure 14 at the four heads are connected to terminals 8, 7, 6, and 5 of strip L respectively.

Assume the variac is moving counterclockwise, back to rest or zero. Current starts at L-2 and goes to the center "right" contact of reversing switch S, thence to the top contact, thence to terminal 10, thence to the common terminal of microswitch 16, thence to the "closed" contact of switch 16, thence to intermediate tap on speed controlling resistor 140, thence to the right end of resistor 140 and to terminal 3 of strip M, and thence in downward direction through the field coil of the motor 20. From the field coil current goes to terminal 4 of strip M, thence to the top "left" contact of the reversing switch, thence to the center contact, thence to motor terminal 2 and through the armature of motor 20, thence to motor terminal 1, thence to the right pole of the manual switch 76, thence to the top contact of switch 76, and back to L-1. The motor runs until the variac reaches zero and the back microswitch 16 is opened. The "open" contact is connected to terminal 3 of strip L, and is used in common for the starting button and time clock circuits. This is shown at L-3 in Figure 16.

Assume now that head 1 is the next one to be used, and that its starting switch is now closed. Current goes from L-2 (Figure 17) through the switch on the head (not shown in Figure 17) and thence to terminal 8 of strip L (for the 601 relay), thence through coil of relay 601, and thence back to L-1. This causes the relay 601 to act, with results as described above in connection with Figure 1, etc.

All four relays have common contacts connected in parallel, and all of the relays pick up current at L-2, which flows up to the right center contact of the reversing switch S, thence by wire 610 through the closed contacts of the relay, 601 and by wire 612 through the coil of the reversing switch S back to L-1. Energization of the coil of switch S opens the top contacts and closes the bottom contacts. This reverses the motor circuit, which may be traced as follows. Current goes from L-2 to the "right" center contact of switch S, thence to bottom contact, thence to the common contact of the forward limit switch 56, thence through the normally closed contact of the limit switch back to the top "left" contact of the reversing switch, thence by wire 614 down to motor terminal 4, thence in upward direction through the field coil of the motor, thence to motor terminal 3, thence to the right or common end of the speed controlling resistor 140, and through the resistor, so that the variac runs faster in the back direction, thence from the left end of resistor 140 to the lower left contact of switch S, thence to the center left contact, thence to motor terminal 2, thence through the armature, thence to motor terminal 1, thence to right center contact of switch 76, thence to top contact, and back to L-1.

The motor has now been reversed, because of the upward flow of current through the field coil, and the variac moves ahead until the forward limit switch 56 is opened. Current then flows from the common terminal of switch 56 to the normally open contact, to the left center pole of manual switch 76, to the top left terminal of manual switch 76, to terminal 9 of strip L, and thence through the stop solenoid 24 back to L-1. The energization of stop solenoid 24 causes the pawl 22 (Figures 1 and 3) to lock the gear 23, as previously explained.

When the time clock runs out the coil of relay 601 is deenergized, its contacts open, switch S is restored to the position first described (and shown in Figure 17), solenoid 24 is deenergized and locking pawl 22 is withdrawn from the teeth of gear 23, and the motor 29 runs the variac shaft and cam back to zero position, all as was previously described.

Figure 3:
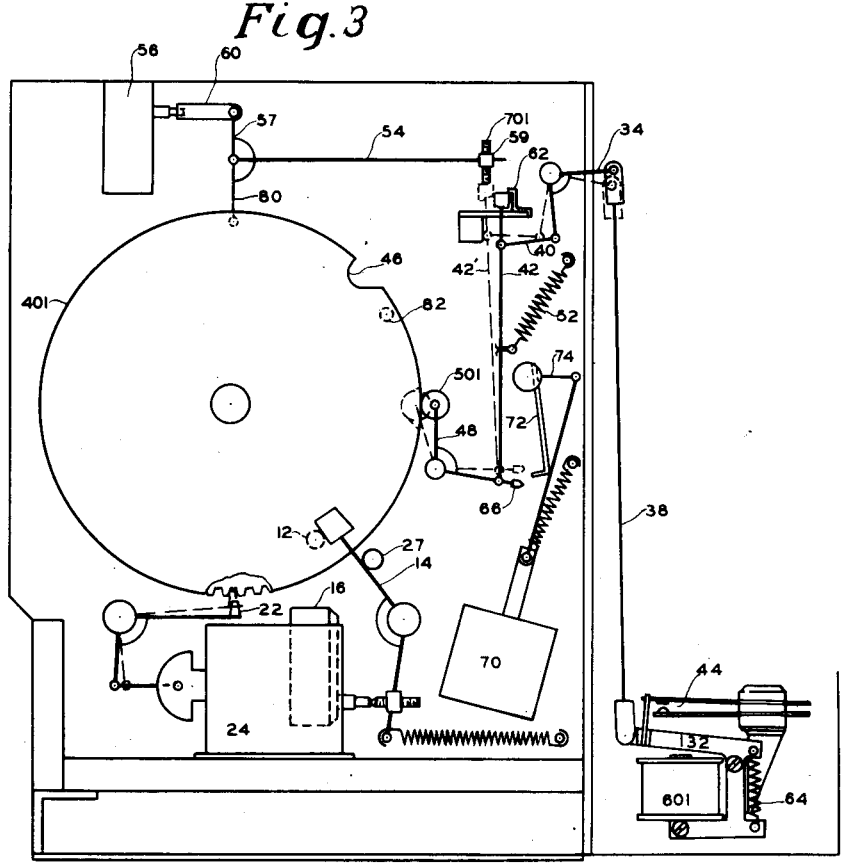
Figure 3 is a schematic diagram explanatory of the operation of the mechanism shown in Figure 1.
Figure 4:
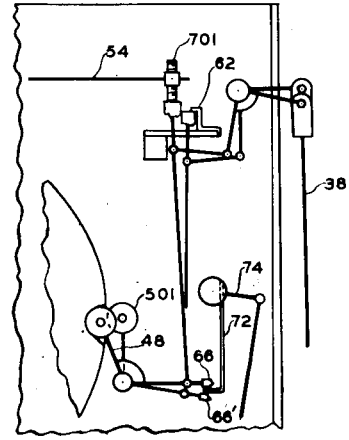
Figure 4 shows a portion of Figure 3 with the parts in different position.

Before concluding, it may be mentioned that when the manual control switch 76 is moved from up position to down position, the motor circuit is opened and current goes to terminal 4 of strip L, and thence through the solenoid 70, and back to L-1. Solenoid 70 actuates the locking plate 72 (Figures 1, 3, and 4). Changing the manual switch thus changes the circuit of the top limit switch so that it no longer controls the pawl actuating solenoid 24, and instead controls the locking solenoid 70.

Figure 16:
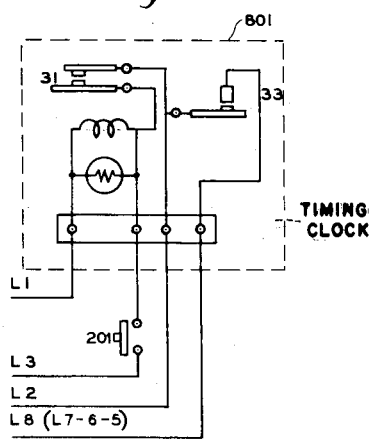
Figure 16 represents the timing clock.

Referring to the time clock shown in Figure 16, L-3 is common to all heads. When the button 201 is pressed, current goes to the solenoid of the clock and back to L-1, causing the clock to close contacts 31 and 33. Current now flows from L-2 to contacts 31 and thence to the solenoid and clock motor and back to L-1. The button 201 may be released immediately because the circuit is now established through contacts 31. L-2 current goes through contacts 33 and thence to terminal 8 (for head 1) and so operates relay 601 (for head 1), all as described above.

The closing of contacts 33 energizes the coil of relay 601, and the closing of its contacts reverses switch S. Inasmuch as button 201 received its current from L-2 to center right contact of switch S to the upper right contact to L-10, to back limit switch 16, to the normally open but now closed contact as shown in Figure 17, to L-3, and because switch S is now reversed, the said current supply is cut off. This serves as an interlock such that pressing of the button on another head will have no effect while the first head is still in use. This applies, of course, to all heads. The action is instantaneous and does not depend upon and takes place even before rotation of the motor and cam shaft, and before switch 16 itself opens the same circuit.

When the predetermined time adjustment runs out the clock resets itself by opening contacts 31, and causes resetting of the variac back to zero by opening contacts 33.

When the clock runs out and opens contacts 33 (Figure 16) it deenergizes the coil of relay 601 (Figure 17) and so opens its contacts, thus putting switch S in the position shown in Figure 17, and current cannot flow to L-3 and the push buttons at the heads until the motor returns the variac to its zero position, and until switch 16 closes its normally open contacts. Thus the changing from one head to another is always done at zero current.

The time of treatment of the pill depends on the voltage or power applied. For a first rough adjustment the operator will adjust the variac back from flashover, as described, and will then determine the time of treatment for that voltage by trial and error. If the time then needed to heat the pill is much less than the time available to heat the pill, the variac output potential may be cut down and the time set on the clock may be commensurately increased.

The present invention may be used with the companion invention disclosed in my copending application, Serial Number 722,521, filed January 17, 1947, now Patent 2,506,814, which discloses apparatus for automatically varying the spacing between the heating electrodes in order to accommodate expansion of the pill as it is heated, and in order to maintain constant frequency. This is of advantage not only to perform the heating operation at the most efficient frequency, but also for maximum efficiency of operation of a radio frequency transmission line between the driver and the heating head when the driver is located remotely from the heating head. This remote location is another feature disclosed in the aforesaid copending application, and it is of advantage in connection with the present invention in which a plurality of heads are driven by a single driver, for it is then possible to locate each of the heads immediately adjacent its own particular molding press, with the driver located in a safe location remote from some or all of the presses.

It is believed that the construction and operation of my improved apparatus, as well as the advantages of the same, will be apparent from the foregoing detailed description.

A pill of one size is placed in head #1 and its associated starting button is pressed, whereupon the radio frequency switch between the driver and head #1 is closed and power applied to the driver is built up until the proper output potential is reached. Simultaneously, the timing clock is started, and when the established time runs out the power is shut off, and the radio frequency switch is opened. The heated pill is removed from the head, and placed in press #1, whereupon the press is closed and remains so, under control of its own timing clock. Meanwhile, a pill of another size is placed in head #2 and its starting button is pressed. This causes the second radio frequency switch to be closed and power is applied until proper output potential for head #2 is reached. When the associated timing clock runs out, the power is shut off, and the switch opened, whereupon the heated pill is removed and molded in press #2, and so on. If the curing time is long enough, all four heads may be used, otherwise a lesser number, say three or two, may be used.

It will be understood that the invention may be applied to apparatus having more or less than the four heads here shown. In fact, it is of some value even with one head because of the gradual application of power to the driver. Other variations and changes may be made. For example, instead of a detent which holds three rollers while releasing a fourth unde rspring action, the four may each have a solenoid to move the same into operative position. Instead of using one of the gears of the mechanism for positive stopping, a separate notched pilot wheel or ratchet wheel may be used for the positive stop. Instead of using a reversing motor to turn the mechanism in either direction, a unidirectional motor may be used to turn the shaft in one direction against a spring, said spring restoring the shaft to starting position when released by running out of the time clock. Instead of using four friction discs with rollers, four discs having set screws or clamps to lock the same in position on the shaft may be used. Each disc could then use its own pawl for positive locking. While this might simplify the mechanism in some respects, it would greatly complicate the work of setting the desired adjustment values for the driver potential, whereas with the present arrangement, these output potential values are quickly and conveniently adjusted.

Because of the foregoing changes and other changes which may be made, it will be apparent that while I have shown and described my invention in a preferred form, many changes and modifications may be made in the structure disclosed without departing from the spirit of the invention, as sought to be defined in the following claims. In some of the claims the variac is referred to as moved up from and later brought back to zero, but this is intended to include a low value instead of zero.

I claim:

1. In a radio frequency heater, a remotely controlled mechanism for moving a variac from zero to any of several different desired positions, said mechanism including a plurality of cam discs on the variac shaft, each of said discs having a stop depression, and being independently rotatively adjustable on the shaft to a desired position, a plurality of stop means for engaging said cams, means to select one of said stop means to engage its cam while the others are held in inoperative position, a motor to move said variac from zero to a stop position, a timing clock, and means responsive to running out of said timing clock to return the variac to zero and to restore the selected stop means to inoperative position.

2. In a radio frequency heater, a remotely controlled mechanism for moving a variac from zero to any of several different desired positions, said mechanism including a motor, a reversing switch for said motor, a timing clock, a plurality of cam discs on the variac shaft, each of said discs having a stop depression, and being independently rotatively adjustable on the shaft to a desired position, a plurality of stop means for engaging said cam, a detent to hold said stop means in inoperative position, remotely controllable magnet means to release one of said stop means from said detent and to start said motor in forward direction, said stop means on entering said cam depression serving to stop said motor and to start said timing clock, said timing clock on running out serving to deenergize said magnet means, and thereby reverse the motor, return the cam and restore the stop means.

3. Mechanism to turn a variac or other control device to any one of multiple desired positions, said mechanism including a motor for driving the variac shaft through reduction gearing, a plurality of discs frictionally secured to the variac shaft, a toothed positive stop element also secured to the variac shaft, a pawl for engaging and locking said stop element, cam rollers engaging said discs, said discs being recessed to receive the rollers to mark a desired stopping point, detent means to hold the rollers in inoperative position, a plurality of control buttons, each of said buttons serving to start the motor in order to rotate the variac in forward direction, and to release one of the cam rollers which, on entering the cam depression, stops the motor and operates the locking pawl.

4. Mechanism to turn a variac or other control device to any one of multiple desired positions, said mechanism including a motor for driving the variac shaft through reduction gearing, a plurality of discs frictionally secured to the variac shaft, a toothed positive stop element also secured to the variac shaft, a pawl for engaging and locking said stop element, cam rollers engaging said discs, said discs being recessed to receive the rollers to mark a desired stopping point, detent means to hold out the rollers, a plurality of control buttons, each of said buttons serving to start the motor in order to rotate the variac in forward direction, and to release one of the cam rollers which, on entering the cam depression, stops the motor and operates the locking pawl, a timing clock, running out of said timing clock serving to release said pawl, reverse said motor, and restore said roller to said detent means.

5. Pill heating apparatus for use with a plurality of molding presses using a plurality of different size pills, said apparatus comprising a heating head for each press, a single radio frequency generator, switches for connecting one head or another to the generator, voltage control means for varying the voltage output of the generator, a motor for driving said voltage control means, a plurality of different independently selectable stop means for stopping movement of said voltage control means, means to independently adjust the stop position of each of said stop means, means to simultaneously select one of the aforesaid switches and a corresponding one of said stop means, whereby the voltage fed to each head may be made of predetermined value suitable for that head, and means to initiate operation of the motor.

6. Pill heating apparatus for use with a plurality of molding presses using a plurality of different size pills, said apparatus comprising a plurality of heating heads for the different presses, a single radio frequency generator, radio frequency switches for connecting one head or another to the generator, a low frequency power supply for the radio frequency generator, a variable auto transformer or variac for varying the voltage supplied to and the output of the radio frequency generator, motor driven means for moving the variac, a plurality of differently adjusted stop means for said motor one of which is selected in unison with one of the aforesaid switches, means to independently adjust the stop position of each of said stop means, whereby the voltage output of the generator supplied to each head is of predetermined desired value for that head, and means to initiate operation of the motor.

7. Pill heating apparatus for use with a plurality of molding presses using a plurality of different size pills, said apparatus comprising a heating head for each press, a single radio frequency generator, a remotely controlled radio frequency switch for each head for connecting one head or another to the generator, a control element at each head for controlling the associated radio frequency switch, movable means for varying the voltage output of the radio frequency generator, a motor for moving the said movable means, independently adjustable stop means for said motor one of which is also selected by one of the aforesaid control elements in unison with one of the switches, means to independently adjust the stop position of each of said stop means, whereby the voltage output of the generator supplied to each head may be made of pre-determined desired value for that head, and means to initiate operation of the motor.

8. Pill heating apparatus for use with a plurality of molding presses using a plurality of different size pills, said apparatus comprising a plurality of heating heads for the different presses, a single radio frequency generator, remotely controlled radio frequency switches for connecting one head or another to the generator, a control element at each head for controlling the associated radio frequency switch, a low frequency power supply for the radio frequency generator, a variable auto transformer or variac for varying the voltage supplied to and the output of the radio frequency generator, motor driven means for moving the variac, independently adjustable stop means for said motor one of which is also selected by the aforesaid control element in unison with one of the switches, means to independently adjust the stop position of each of said stop means, whereby the voltage output of the generator supplied to each head may be made of predetermined desired value for that head, and means to initiate operation of the motor.

9. Pill heating apparatus for use with a molding press, said apparatus comprising a heating head including spaced electrodes, a radio frequency generator for supplying radio frequency power to said electrodes, a power supply means for said generator including a step-up transformer, rectifier, and filter, a voltage control means such as a variable auto transformer or variac for varying the voltage fed to the step-up transformer, a motor to vary said variac, and means to so operate said motor as to automatically advance the aforesaid fed voltage progressively from zero or near-zero at the beginning of each heating cycle up to the desired voltage, and to automatically reduce the voltage to zero or near-zero at the end of each heating cycle.

10. Pill heating apparatus for use with a molding press, said apparatus comprising a heating head including spaced electrodes, a radio frequency generator for supplying radio frequency power to said electrodes, a voltage varying means for said generator, a motor to move said voltage varying means, an automatic stop mechanism associated with the motor and voltage varying means in order to provide different automatic stop positions and voltages each preselected for pills of different size, and multiple push buttons for controlling said stop mechanism, each of said buttons serving to start the motor and to independently select one of said automatic stop positions.

11. Pill heating apparatus for use with a molding press, said apparatus comprising a heating head including spaced electrodes, a radio frequency generator for supplying radio frequency power to said electrodes, a power supply means for said generator including a step-up transformer, rectifier, and filter, a voltage control means such as a variable auto transformer or variac for varying the voltage fed to the step-up transformer, a motor to move the variac, an automatic stop mechanism associated with the motor and variac in order to provide different automatic stop positions and voltages each preselected for pills of different size, and multiple push buttons for controlling said stop mechanism, each of said buttons serving to start the motor and to independently select one of said automatic stop positions.

12. Pill heating apparatus for use with a plurality of molding presses using a plurality of different size pills, said apparatus comprising a heating head for each press, a radio frequency generator, radio frequency switches for connecting one head or another to the generator, a plurality of control elements at the heads for controlling relay circuits, a variable auto transformer or variac for varying the voltage output of the radio frequency generator, a motor for driving the variac shaft, a plurality of stop discs adjustably secured to the variac shaft, stop means for engaging said discs, said adjustable discs being recessed to mark a desired stopping point depending on the adjustment of the disc relative to the shaft and corresponding to the desired radio frequency voltage for the corresponding head, and a timing clock for timing the heating of the pills, each of the aforesaid relay circuits serving to close a radio frequency switch, and to start the motor in order to rotate the variac in forward direction, and to start the timing clock, and to make one of the stop means operative, said stop means stopping the variac at the desired point, and running out of said timing clock serving to oppositely change said relay circuit and to reverse the motor, and open the radio frequency switch.

13. Pill heating apparatus for use with a plurality of molding presses using a plurality of different size pills, said apparatus comprising a heating head for each press, a radio frequency generator, radio frequency switches for connecting one head or another to the generator, a plurality of control elements at the heads for controlling the radio frequency switches, means including a shaft for varying the voltage output of the radio frequency generator, a motor for moving said shaft, a plurality of discs frictionally secured to the shaft, a toothed stop element secured to said shaft, a pawl for engaging and locking said stop element, cam rollers engaging said discs, said discs being recessed to receive the rollers to mark a desired stopping point depending on the adjustment of the disc relative to the staft and corresponding to the desired radio frequency voltage for the corresponding head, and detent means to hold out and make inoperative the rollers, each of the aforesaid control elements serving to close a radio frequency switch, and to start the motor in order to rotate the aforesaid shaft in forward direction, and to release and make operative a cam roller which on entering the cam depression changes the position of a switch and thereby stops the motor and operates the locking pawl.

14. Pill heating apparatus for use with a plurality of molding presses using a plurality of different size pills, said apparatus comprising a heating head for each press, a radio frequency generator, radio frequency switches for connecting one head or another to the generator, a plurality of control elements at the heads for controlling relay circuits, means including a shaft for varying the voltage output of the radio frequency generator, a motor for moving said shaft, a plurality of discs frictionally secured to the shaft, a toothed stop element secured to said shaft, a pawl for engaging and locking said stop element, cam rollers engaging said discs, said discs being recessed to receive the rollers to mark a desired stopping point depending on the adjustment of the disc relative to the shaft and corresponding to the desired radio frequency voltage for the corresponding head, detent means to hold out and make inoperative the rollers, and a timing clock for timing the heating of the pills, each of the aforesaid relay circuits serving to close a radio frequency switch, and to start the motor in order to rotate the shaft in forward direction, and to start the timing clock, and to release and make operative a cam roller which on entering the cam depression changes the position of a switch and thereby stops the motor and operates the locking pawl, running out of said timing clock serving to oppositely change said relay circuit and to thereby release the pawl, to reverse the motor, to restore the roller to the detent means, and to open the radio frequency switch.

15. Pill heating apparatus for use with a plurality of molding presses using a plurality of different size pills, said apparatus comprising a heating head for each press, a radio frequency generator, radio frequency switches for connecting one head or another to the generator, a plurality of control elements at the heads for controlling the radio frequency switches, a low frequency power supply for the radio frequency generator including a variable transformer or variac for varying the voltage output of the radio frequency generator, a motor for driving the variac shaft through reduction gearing, a plurality of discs frictionally secured to the variac shaft, a toothed stop element secured to said shaft, a pawl for engaging and locking said stop element, cam rollers engaging said discs, said discs being recessed to receive the rollers to mark a desired stopping point depending on the adjustment of the disc relative to the shaft and corresponding to the desired radio frequency voltage for the corresponding head, and detent means to hold out and make inoperative the rollers, each of the aforesaid control elements serving to close a radio frequency switch, and to start the motor in order to rotate the variac in forward direction, and to release and make operative a cam roller which on entering the cam depression changes the position of a switch and thereby stops the motor and operates the locking pawl.

16. Pill heating apparatus for use with a plurality of molding presses using a plurality of different size pills, said apparatus comprising a heating head for each press, a radio frequency generator, radio frequency switches for connecting one head or another to the generator, a plurality of control elements at the heads for controlling relay circuits, a low frequency power supply for the radio frequency generator including a variable transformer or variac for varying the voltage output of the radio frequency generator, a motor for driving the variac shaft through reduction gearing, a plurality of discs frictionally secured to the variac shaft, a toothed stop element secured to said shaft, a pawl for engaging and locking said stop element, cam rollers engaging said discs, said discs being recessed to receive the rollers to mark a desired stopping point depending on the adjustment of the disc relative to the shaft and corresponding to the desired radio frequency voltage for the corresponding head, detent means to hold out and make inoperative the rollers, and a timing clock for timing the heating of the pills, each of the aforesaid relay circuits serving to close a radio frequency switch, and to start the motor in order to rotate the variac in forward direction, and to start the timing clock, and to release a cam roller which on entering the cam depression changes the position of a switch and thereby stops the motor and operates the locking pawl, running out of said timing clock serving to oppositely change said relay circuit and to thereby release the pawl, reverse the motor, restore the roller to the detent means, and open the radio frequency switch.

17. A remotely controlled mechanism for moving a variac or like control device from zero to any of several different desired positions, said mechanism including a motor to drive the variac shaft, a switch to control the operation of the motor, a toothed wheel positively secured to said shaft, a pawl for engaging the teeth of said wheel to stop and lock the shaft, a plurality of cams frictionally rotatable on said shaft, each of said cams having a stop depression and being independently rotatively adjustable on the shaft to a desired position, a plurality of cam rollers for engaging said cams, a detent for normally holding said cam rollers in inoperative position, means for selecting and releasing one of said cam rollers from said detent to operative position, said cam roller on entering the stop depression of its associated cam serving to change the position of said motor switch and thereby serving to deenergize the motor and to actuate said locking pawl, and additional means to facilitate adjusting the desired stop positions of the cams, said means including a position locking means for so positively holding the selected cam roller in its stop depression that it is not forced out by attempted rotation of the cam, means for making said locking pawl inoperative, and a handle on said variac shaft for forcibly rotating the shaft and with it all but one of the cams, the excepted cam being locked against rotation by the aforesaid cam roller and locking means.

18. Pill heating apparatus for use with a plurality of molding presses using a plurality of different size pills, said apparatus comprising a heating head for each press, a single radio frequency generator, switches for connecting one head or another to the generator, a plurality of control elements, voltage control means for varying the voltage output of the generator, a motor for driving said voltage control means, a plurality of different independently selectable stop means for stopping movement of said voltage control means at a desired point, means to independently adjust the stop position of each of said stop means, a timing clock for timing the heating of the pills, each of the aforesaid control elements serving to close one of the switches and to start the motor in order to move the voltage control means in forward direction and to start the timing clock and to make one of the stop means operative, said stop means stopping the motor at the desired voltage output, and running out of said timing clock serving to reverse the motor and open the switch.

GORDON B. SAYRE.

REFERENCES CITED

The following references are of record in the file of this patent:

UNITED STATES PATENTS

| Number | Name | Date |
|---|---|---|
| 1,513,681 | Ward | Oct. 28, 1924 |
| 2,036,516 | Golanduoni | Apr. 7, 1936 |
| 2,085,442 | Newell | June 29, 1937 |
| 2,094,777 | Ellinger | Oct. 5, 1937 |
| 2,102,070 | Harris | Dec. 14, 1937 |
| 2,153,865 | Gersch | Apr. 11, 1939 |
| 2,234,911 | Davis | Mar. 11, 1941 |
| 2,251,277 | Hart, Jr., et al. | Aug. 5, 1941 |
| 2,275,284 | Carlson | Mar. 3, 1942 |
| 2,280,766 | Bronaugh | Apr. 21, 1942 |
| 2,293,851 | Rogers | Aug. 25, 1942 |
| 2,334,724 | Paessler | Nov. 23, 1943 |
| 2,367,763 | Elliott | Jan. 23, 1945 |
| 2,391,470 | May | Dec. 25, 1945 |
| 2,401,277 | Stratton | May 28, 1946 |
| 2,401,991 | Walton et al. | June 11, 1946 |
| 2,403,800 | Hoyler | July 9, 1946 |
| 2,415,799 | Riefel et al. | Feb. 11, 1947 |
| 2,419,307 | Zottu | Apr. 22, 1947 |
| 2,490,619 | Clark | Dec. 6, 1949 |
| 2,506,814 | Sayre | May 9, 1950 |